March 25, 1924.

C. A. BAKER

TIRE ALARM

Original Filed Sept. 14, 1921  2 Sheets-Sheet 1

1,488,426

Inventor
Charles A. Baker,
By H. Ralph Burton,
Attorney

Witness:-
Chas. L. Griesbauer

March 25, 1924.
C. A. BAKER
TIRE ALARM
1,488,426
Original Filed Sept. 14, 1921    2 Sheets-Sheet 2
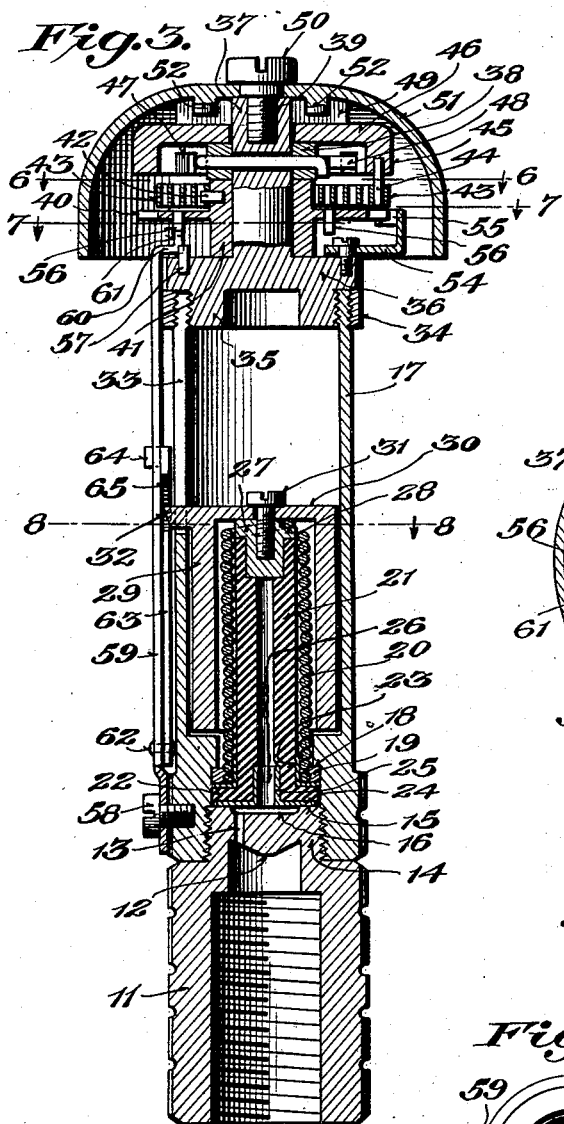
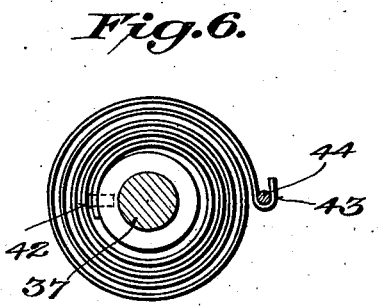
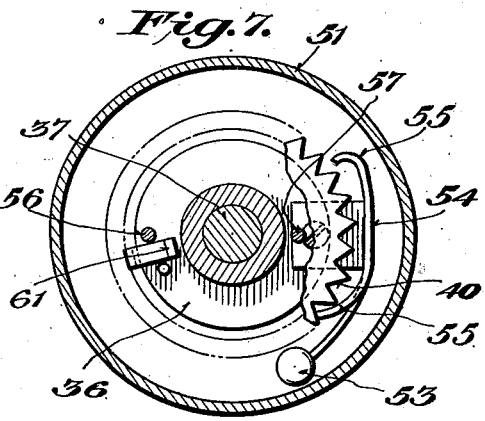
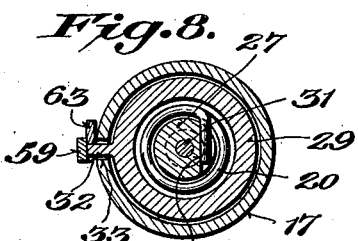
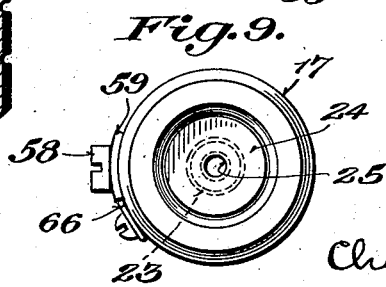
Inventor
Charles A. Baker,
By H. Ralph Burton,
Attorney
WITNESS:—
Chas. L. Griesbauer Patented Mar. 25, 1924.

1,488,426

UNITED STATES PATENT OFFICE.

CHARLES A. BAKER, OF GREAT FALLS, MONTANA.

TIRE ALARM.

Application filed September 14, 1921, Serial No. 500,505. Renewed February 6, 1924.

*To all whom it may concern:*

Be it known that I, CHARLES A. BAKER, a citizen of the United States, residing at Great Falls, in the county of Cascade and State of Montana, have invented certain new and useful Improvements in Tire Alarms, of which the following is a specification.

The invention relates to devices arranged to be associated with air-inflated vehicle-tires for the purpose of indicating when air pressure in such a tire has been reduced to a point that endangers the further use thereof.

It is an object of the invention to provide a device of that kind that will give an audible alarm on occurrence of such a condition, and generally to improve and increase the efficiency of the device.

Another object of the invention is to make the device in such manner that it can be attached easily to the valve of the tire, and so to arrange the parts thereof that operation of the alarm mechanism is not dependent upon escape of air through the device.

When considered in connection with the description herein, the characteristics of the invention will be apparent from the accompanying drawings, forming part hereof, wherein an embodiment of the invention is disclosed, for purposes of illustration.

Although the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Figure 1:
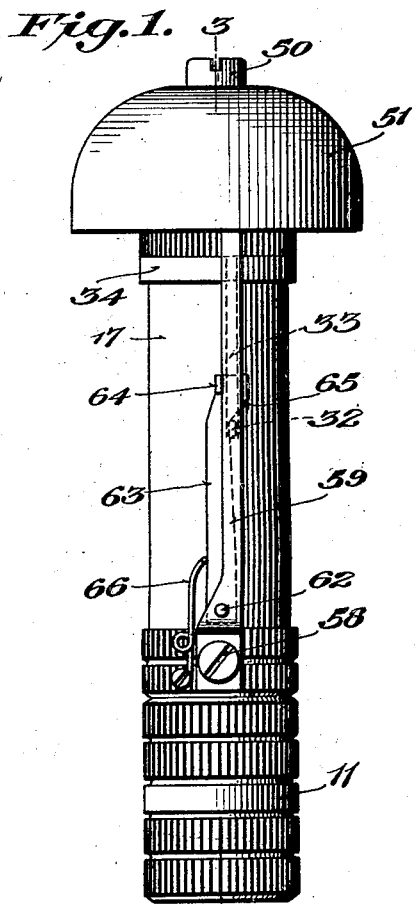
Figure 2:
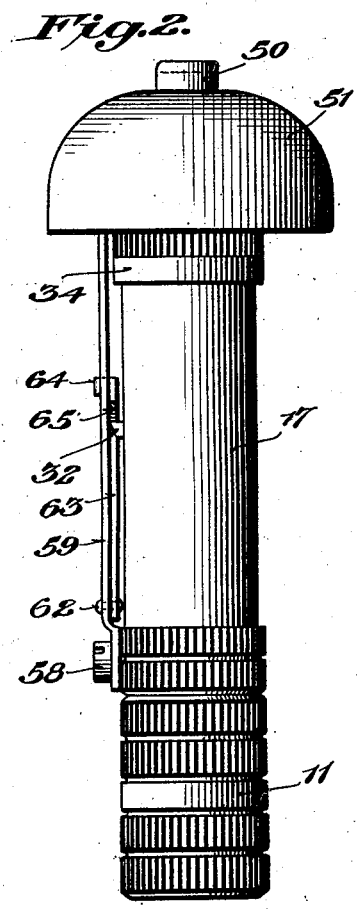
Figures 4, 5:
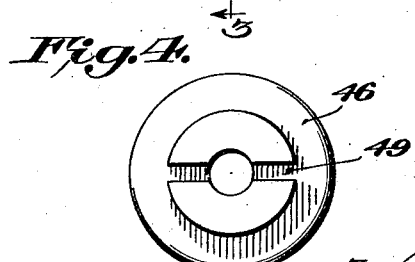
Figure 10:

Fig. 1 is a front elevation;
Fig. 2 is a side elevation;
Fig. 3 is a longitudinal section;
Fig. 4 is a plan view of the cap member;
Fig. 5 is a bottom view of the cap member;
Fig. 6 is a section on the line 6—6, Fig. 3;
Fig. 7 is a section on the line 7—7, Fig. 3;
Fig. 8 is a section on the line 8—8, Fig. 3;
Fig. 9 is an end view of the casing; and
Fig. 10 is an end view of the connecting member.

Having more particular reference to the drawings, 11 designates a hollow cylindrical connecting member closed at one end and open at the other. The member is interiorly threaded and arranged to be screwed over the threaded wall of a tire-valve casing and to cause a protuberance 12 at its closed end to engage the stem of, and to hold open, the valve. A passage 13 extends through the end wall of the member 11, and it is arranged to receive air liberated on opening the valve. The closed end of the member 11 has an exteriorly-threaded nipple 14, formed with an annular terminal seat 15 surrounding a depression 16 into which the passage 13 leads.

A cylindrical casing 17 is connected to the member 11 by the nipple 14, which is screwed into one end thereof.

The casing has near that end an interior annular seat 18, against which is seated a ring 19. A coil-spring 20, tensioned to resist elongation, is secured at one end inside of the ring 19. A tube 21, of rubber or other suitable elastic material, is disposed inside of the spring and is elongatable therewith. It has at one end an annular flange 22, against which is disposed a metallic washer 23, which seats against the ring 19. The tube thus is fixed at one end and left free to elongate or stretch in its other portion. A ferrule includes a disk 24, which is interposed between the opposite side of the flange 22 and the annular seat 15, and a stem 25, which projects into the tube. A passage 26 extends through the ferrule from the depression 16 of the nipple to the interior of the tube. The inner end of the tube is closed by, and connected to, a metallic plug 27, which has a peripheral seat 28 with which is engaged an inwardly-deflected end of the spring. The arrangement is such that, when the tube is elongated, the spring also will be elongated.

The end portions of the spring and tube opposite to the seat 18 are disposed inside of a cylindrical sleeve 29. The sleeve has a head 30, which is connected to the plug by a screw 31 extending thereinto. The sleeve is insertable into the casing through the end opposite to the connecting member 11 while that end is open, and it is arranged to have longitudinal movement in the casing. A projection or release-lug 32 on the sleeve has an inclined or cam end, and it extends through a longitudinal slot 33 in the wall of the casing. The slot extends to the end of the casing through which the sleeve is inserted, in order to permit the lug to be passed into the slot. That end of the casing is strengthened by a ring 34, which is screwed thereon after the interior parts are in place.

The end of the casing opposite to the connecting member 11 is closed by a plug member. That member includes a shank 35, which is screwed into the casing, a disk 36, which seats against the end of the casing and against the ring 34, and a concentric stem 37, which has a removable annular abutment 38 and a threaded seat 39 in its end.

A ratchet-wheel 40 is carried by a hub 41 rotatable on the stem 37 between the disk 36 and the abutment 38, the wheel being positioned about midway between the ends of the hub. The portion of the hub adjacent to the abutment 38 has a pin or projection 42 by which it is connected with one end of a volute spring 43 arranged to be wound on the hub.

The other end of the spring is connected by a pin 44 to a peripheral flange 45 of a cap member 46 rotatably mounted on the end portion of the stem 37. The flange has internal teeth 47, which are engageable with a spring-pawl 48 mounted on the abutment 38, whereby to prevent rotation of the cap in one direction. The cap on its side opposite to its flange has one or more seats, recesses, or radial grooves 49.

A screw 50 in the threaded seat 39 holds a bell 51 on the end of the stem and against the cap member 46, and the cap member thereby also is retained in the stem. The bell has one or more projections 52 seated in one or more of the seats, recesses, or grooves 49 of the cap member, whereby that member is rotated by rotation of the bell. The bell is of generally semi-spherical shape. It extends over and affords a protective covering for the spring, ratchet-wheel, and a bell-striker 53.

The striker is connected to or is formed integrally with a flat member 54 swingably mounted on the disk 36. Detent-arms 55 extend oppositely from the member 54, and they are arranged to be engaged by the ratchet-wheel at their ends, so that, as the wheel is rotated, the striker is caused to strike the bell. The ratchet-wheel has one or more stop-projections 56 on its side facing the disk 36, and the disk has a stop-projection 57.

For the purpose of holding the ratchet-wheel against rotation by the spring, there is secured to the casing 17 by a screw 58 a spring-arm 59. That arm extends over the slot 33, and its free end portion 60 projects at substantially right angles between the ratchet-wheel and the disk 36, it seats against the stop 57, and it has a terminal lug 61 that normally is engaged by one of the stops 56. At 62 an arm 63 is swiveled to the arm 59 between it and the casing, a lug 64 on the arm 63 is contactable with an edge of the arm 59, the arm 63 has a cam 65 at or near its free end, and a spring 66 normally maintains the lug 64 against the arm 59 and the cam under the arm and restrains them from movement from those positions. The parts are formed and positioned in such manner that, when the spring 20 and tube 21 are elongated, the release lug 32 swings the arm 62 as it passes by the cam 65; and, when the release-lug moves in the opposite direction, its cam end engages under the arm 62 and moves that arm and the arm 59 outwardly and withdraws the terminal lug 61 from engagement with the projection 56 on the ratchet-wheel and leaves that wheel free to rotate under the influence of the spring 43.

In use, the connecting member 11 takes the place of the cap usually present on tire-valve casings of common form; the protuberance 12, as previously described, opens the tire-valve sufficiently to permit air to pass through the passage 13 into the elongatable tube 21; and, when the tire is inflated to normal or safe extent, the air pressure is sufficient to elongate the tube and the spring 20 and to move the sleeve to such position that the release-lug 32 is past the cam 65 and to maintain it in that position. The spring 20 is of sufficient strength and so tensioned that, when air pressure in the tire becomes diminished nearly to the point when it is unsafe further to use the tire, it will move the sleeve and its release-lug in the opposite direction past the cam. During that movement, the inclined or cam end of the release-lug, on engagement under the cam 65, moves the arm 59 outwardly and disengages the terminal lug thereof from the projection 56 on the ratchet-wheel with which it has been in contact. Thereupon that wheel is rotated by the spring 43, the bell is rung, and indication thereby given of the condition in the tire.

It is necessary to take from the tire only the inconsequential amount of air necessary to elongate the tube, and thereafter operation of the alarm is effected by the spring and without further emission of air from the tire through the device.

The spring 43 is wound by turning the bell, reverse movement of the cap member 46 is prevented by the pawl 48, the terminal lug 64 of the arm 63 normally prevents rotation of the ratchet-wheel, and displacement of that arm is prevented by the stop 57.

Having thus described my invention, what I claim as new, and desire to secure by Letters Patent, is—

1. An alarm device comprising a casing, an elongatable tube therein arranged to receive air from a tire, a spring resisting elongation of said tube, a movable member whose position is dependent upon the amount of elongation of said tube, indicating means, and a control member therefor operable by said movable member.

2. An alarm device comprising a casing, an elongatable tube therein arranged to receive air from a tire, a spring resisting elongation of said tube, a movable member connected with said tube, indicating means, a control member therefor, and a projection on said movable member arranged to operate said control member.

3. An alarm device comprising a casing, an elongatable tube therein arranged to receive air from a tire, a coil-spring into which said tube extends arranged to resist elongation thereof, a sleeve into which said spring extends connected with said tube, a projection on said sleeve, indicating means, and a control member therefor operable by said projection.

4. An alarm device comprising a casing, an elongatable tube therein arranged to receive at one end air from a tire and fixed at that end, a metallic plug in the free end of said tube, a coil-spring into which said tube extends arranged to resist elongation thereof, a sleeve into which said spring extends connected to said plug, a projection on said sleeve, indicating means, and a control member therefor operable by said projection.

5. An alarm device comprising a casing open at one end having therein near that end an annular seat, a ring on said seat, a coil-spring connected to said ring, an elongatable tube extending into said spring arranged to receive air from a tire, a movable member whose position is dependent upon the amount of elongation of said tube, indicating means, and a control member therefor operable by said movable member.

6. An alarm device comprising a casing open at one end having therein near that end an annular seat, a ring on said seat, a coil-spring connected to said ring, an elongatable tube extending into said spring arranged to receive air from a tire and having a flange seated against said ring, a movable member whose position is dependent upon the amount of elongation of said tube, indicating means, and a control member therefor operable by said movable member.

7. An alarm device comprising a connecting member closed at one end arranged to be screwed onto a tire-valve wall and having a projection arranged to open the valve, a threaded nipple on the closed end of said member having a depression in its end, an annular seat surrounding said depression, there being a passage from the interior of the member to said depression, a casing arranged to receive said nipple at one end and having an annular seat therein near that end, a ring on said seat, a coil-spring connected to said ring, an elongatable tube extending into said spring having at one end a flange seated against said ring and closed at the other end, a metallic disk having a passage seated against said flange arranged to be engaged by the annular seat of said nipple, a member whose position is dependent upon the amount of elongation of said tube, indicating means, and a control member therefor operable by said movable member.

8. An alarm device comprising a casing, an elongatable tube therein arranged to receive air from a tire at one end of the casing, a spring resisting elongation of said tube, a movable member whose position is dependent upon the amount of elongation of said tube, a plug closing the other end of the casing, a spring-actuated bell mechanism on said plug, and a control member for said mechanism operable by said movable member.

9. An alarm device comprising a casing having a longitudinal slot, an elongatable tube therein arranged to receive air from a tire, a spring resisting elongation of said tube, a movable member in said casing whose position is dependent upon the amount of elongation of said tube, a projection on said member having an inclined end extending through said slot, a spring-arm on said casing, a release-arm swingably mounted thereon having a cam whereby it is swung by said projection when the latter is moved in one direction, said spring and release arms being arranged to be moved outwardly by contact of the inclined end of said projection with the latter arm on movement of the projection in the opposite direction, a spring restraining swinging movement of said release-arm, and an alarm mechanism controlled by said spring-arm.

In witness whereof, I affix my signature.

CHARLES A. BAKER.